US011934008B2

United States Patent
Bian et al.

(10) Patent No.: US 11,934,008 B2
(45) Date of Patent: Mar. 19, 2024

(54) METAMATERIAL EDGE COUPLERS IN THE BACK-END-OF-LINE STACK OF A PHOTONICS CHIP

(71) Applicant: GlobalFoundries U.S. Inc., Santa Clara, CA (US)

(72) Inventors: Yusheng Bian, Ballston Lake, NY (US); Roderick A. Augur, Saratoga Springs, NY (US); Kenneth J. Giewont, Hopewell Junction, NY (US); Karen Nummy, Newburgh, NY (US)

(73) Assignee: GlobalFoundries U.S. Inc., Santa Clara, CA (US)

( * ) Notice: Subject to any disclaimer, the term of this patent is extended or adjusted under 35 U.S.C. 154(b) by 0 days.

(21) Appl. No.: 18/083,716

(22) Filed: Dec. 19, 2022

(65) Prior Publication Data

US 2023/0117802 A1 Apr. 20, 2023

Related U.S. Application Data

(63) Continuation of application No. 17/173,639, filed on Feb. 11, 2021, now Pat. No. 11,567,261.

(51) Int. Cl.
*G02B 6/12* (2006.01)
*F21V 8/00* (2006.01)
(Continued)

(52) U.S. Cl.
CPC .......... *G02B 6/1228* (2013.01); *G02B 6/0046* (2013.01); *G02B 6/1225* (2013.01);
(Continued)

(58) Field of Classification Search
CPC .................. G02B 6/1228; G02B 2006/12152
See application file for complete search history.

(56) References Cited

U.S. PATENT DOCUMENTS

| | | | | |
|---|---|---|---|---|
| 6,975,798 B2 * | 12/2005 | Blauvelt | ............... | G02B 6/125 385/39 |
| 9,128,240 B2 | 9/2015 | Hatori et al. | | |

(Continued)

FOREIGN PATENT DOCUMENTS

| | | |
|---|---|---|
| CN | 108241190 A | 7/2018 |
| CN | 108983352 A | 12/2018 |

(Continued)

OTHER PUBLICATIONS

Pavel Cheben et al., "Refractive index engineering with subwavelength gratings for efficient microphotonic couplers and planar waveguide multiplexers," Optics Letter 35, 2526-2528 (2010).

(Continued)

*Primary Examiner* — Charlie Y Peng
(74) *Attorney, Agent, or Firm* — Thompson Hine LLP; Anthony Canale

(57) ABSTRACT

Structures for an edge coupler and methods of forming a structure for an edge coupler. The structure includes a waveguide core over a dielectric layer, and a back-end-of-line stack over the waveguide core and the dielectric layer. The back-end-of-line stack includes an interlayer dielectric layer, a side edge, a first feature, a second feature, and a third feature laterally arranged between the first feature and the second feature. The first feature, the second feature, and the third feature are positioned on the interlayer dielectric layer adjacent to the side edge, and the third feature has an overlapping relationship with a tapered section of the waveguide core.

20 Claims, 12 Drawing Sheets

(51) Int. Cl.
  *G02B 6/122* (2006.01)
  *G02B 6/14* (2006.01)
(52) U.S. Cl.
  CPC ...... *G02B 6/14* (2013.01); *G02B 2006/12035* (2013.01); *G02B 2006/1215* (2013.01); *G02B 2006/12152* (2013.01)

(56) References Cited

U.S. PATENT DOCUMENTS

| | | | |
|---|---|---|---|
| 9,703,047 | B2 | 7/2017 | Painchaud et al. |
| 10,126,500 | B2 | 11/2018 | Qi et al. |
| 10,197,731 | B2 | 2/2019 | Teng et al. |
| 11,378,743 | B1 | 7/2022 | Bian et al. |
| 2006/0228074 | A1 | 10/2006 | Lipson et al. |
| 2012/0230635 | A1 | 9/2012 | Yoshida |
| 2014/0233881 | A1* | 8/2014 | Hatori ............... G02B 6/12002 385/14 |
| 2015/0010266 | A1* | 1/2015 | Webster ............... G02B 6/30 438/31 |
| 2015/0247974 | A1 | 9/2015 | Painchaud et al. |
| 2016/0349454 | A1 | 12/2016 | Zhang et al. |
| 2017/0017034 | A1 | 1/2017 | Painchaud et al. |
| 2018/0039026 | A1 | 2/2018 | Novack et al. |
| 2018/0067259 | A1 | 3/2018 | Teng et al. |
| 2020/0124796 | A1 | 4/2020 | Bian et al. |
| 2022/0229250 | A1 | 7/2022 | Bian et al. |

FOREIGN PATENT DOCUMENTS

| | | |
|---|---|---|
| CN | 109031518 A | 12/2018 |
| CN | 110658586 A | 1/2020 |

OTHER PUBLICATIONS

T. Barwicz et al., "An O-band Metamaterial Converter Interfacing Standard Optical Fibers to Silicon Nanophotonic Waveguides," in Optical Fiber Communication Conference, OSA Technical Digest (online) (Optical Society of America, 2015), paper Th3F.3.

M. Teng, B. Niu, K. Han, S. Kim, Y. Xuan, Y. J. Lee, and M. Qi, "Trident shape SOI metamaterial fiber-to-chip edge coupler," in Optical Fiber Communication Conference (OFC) 2019, OSA Technical Digest (Optical Society of America, 2019), paper Tu2J.6.

Kuanping Shang at al., "Silicon nitride tri-layer vertical Y-junction and 3D couplers with arbitrary splitting ratio for photonic integrated circuits, " Optics Express 25, 10474-10483 (2017).

L. Rechtman and D. M. Marom, "Refractive Index Grading Optimization for Rectangular Core Fiber," 2020 Optical Fiber Communications Conference and Exhibition (OFC), San Diego, CA, USA, 2020, pp. 1-3.

Mu, Xin; Wu, Sailong; Cheng, Lirong; Fu, H.Y. 2020. "Edge Couplers in Silicon Photonic Integrated Circuits: A Review" Appl. Sci. 10, No. 4: 1538.

Martin Papes et al., "Fiber-chip edge coupler with large mode size for silicon photonic wire waveguides," Optics Express 24, 5026-5038 (2016).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611.

Y. Bian et al., "3D Integrated Laser Attach Technology on 300-mm Monolithic Silicon Photonics Platform," 2020 IEEE Photonics Conference (IPC), Vancouver, BC, Canada, 2020, pp. 1-2.

B. Peng et al. "A CMOS Compatible Monolithic Fiber Attach Solution with Reliable Performance and Self-alignment," in Optical Fiber Communication Conference (OFC) 2020, OSA Technical Digest (Optical Society of America, 2020), paper Th3I.4.

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optical Society of America, 2020), paper FW5D.2.

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optical Society of America, 2020), paper T3H.3.

Y. Bian, et al., "Light manipulation in a monolithic silicon photonics platform leveraging 3D coupling and decoupling," in Frontiers in Optics / Laser Science, B. Lee, C. Mazzali, K. Corwin, and R. Jason Jones, eds., OSA Technical Digest (Optical Society of America, 2020), paper FTu6E.3.

China National Intellectual Property Administration, First Office Action and Search Report issued in Chinese Patent Application No. 202111330838.3 dated Jun. 26, 2023 (7 pages).

* cited by examiner

METAMATERIAL EDGE COUPLERS IN THE BACK-END-OF-LINE STACK OF A PHOTONICS CHIP

BACKGROUND

The present invention relates to photonics chips and, more specifically, to structures for an edge coupler and methods of forming a structure for an edge coupler.

Photonics chips are used in numerous applications, such as data communication systems and data computation systems. A photonics chip integrates optical components, such as waveguides, optical switches, couplers, and modulators, and electronic components, such as field-effect transistors, into a unified platform. Among other factors, layout area, cost, and operational overhead may be reduced by the chip-level integration of both types of components.

A photonics chip may include a multilayer stack formed by back-end-of-line processing over the optical components and electronic components. The multilayer stack has interlayer dielectric layers that are arranged in different levels and metal lines that are placed in the interlayer dielectric layers. The interlayer dielectric layers provide electrical isolation, and the metal lines are vertically interconnected by vias. Conventional photonics chips do not place optical components, such as grating couplers or waveguides, in the multilayer stack. Instead, optical components are formed during middle-of-line and front-end-of-line processing, which are followed by back-end-of-line processing to form the multilayer stack.

An edge coupler is commonly used for coupling laser light between an optical fiber and the optical components on the photonics chip. The edge coupler may include a tapered section of a waveguide core that has a significantly smaller mode size than the laser light received from the optical fiber. Edge couplers are fabricated during middle-of-line and front-end-of-line processing along with other optical components of the photonics chip. Due to the large mode size mismatch, direct butt-coupling between the optical fiber and the edge coupler leads to a significant power loss.

Improved structures for an edge coupler and methods of forming a structure for an edge coupler are needed.

SUMMARY

In an embodiment of the invention, a structure for an edge coupler is provided. The structure includes a waveguide core over a dielectric layer, and a back-end-of-line stack over the waveguide core and the dielectric layer. The back-end-of-line stack includes an interlayer dielectric layer, a side edge, a first feature, a second feature, and a third feature laterally arranged between the first feature and the second feature. The first feature, the second feature, and the third feature are positioned on the interlayer dielectric layer adjacent to the side edge, and the third feature has an overlapping relationship with a tapered section of the waveguide core.

In an embodiment of the invention, a method of forming a structure for an edge coupler is provided. The method includes forming a waveguide core over a dielectric layer, and forming a back-end-of-line stack over the waveguide core and the dielectric layer that includes an interlayer dielectric layer, a side edge, a first feature, a second feature, and a third feature laterally arranged between the first feature and the second feature. The first feature, the second feature, and the third feature are positioned on the interlayer dielectric layer adjacent to the side edge, and the third feature has an overlapping relationship with a tapered section of the waveguide core.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
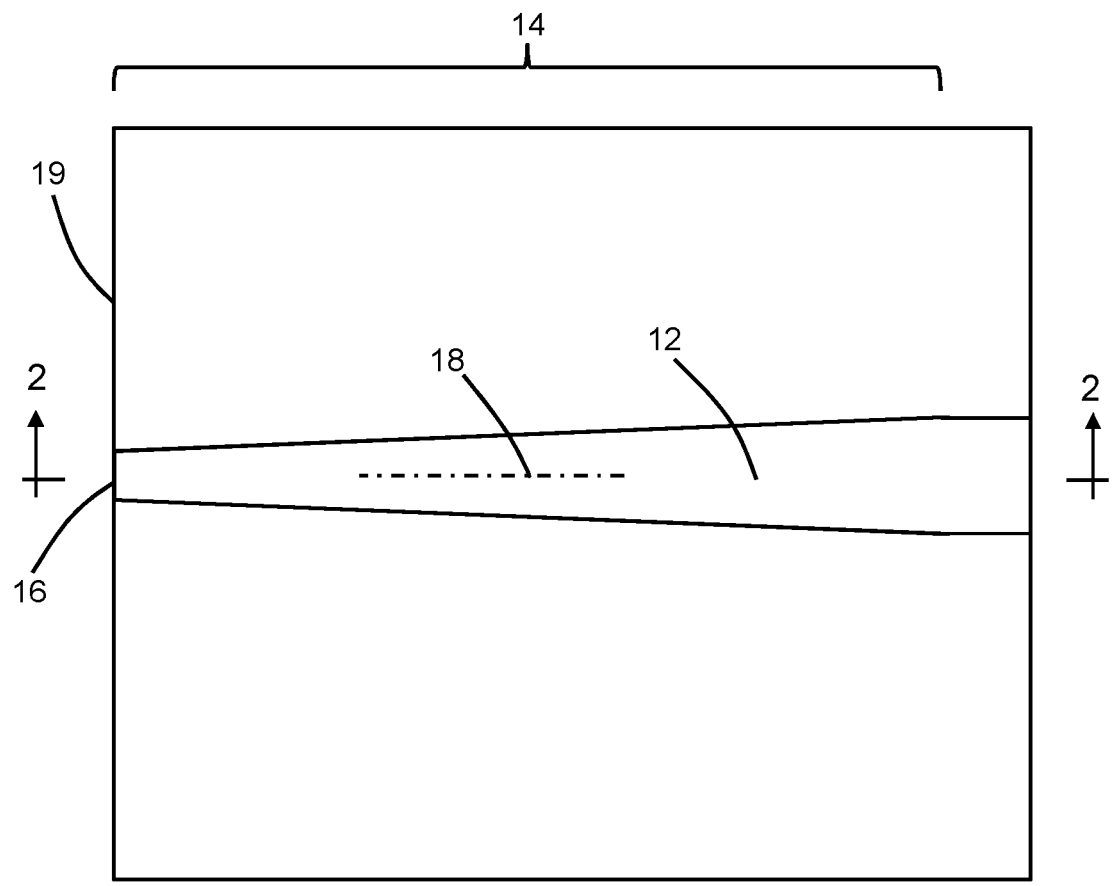
FIG. 1 is a top view of a structure at an initial fabrication stage of a processing method in accordance with embodiments of the invention.
Figure 2:
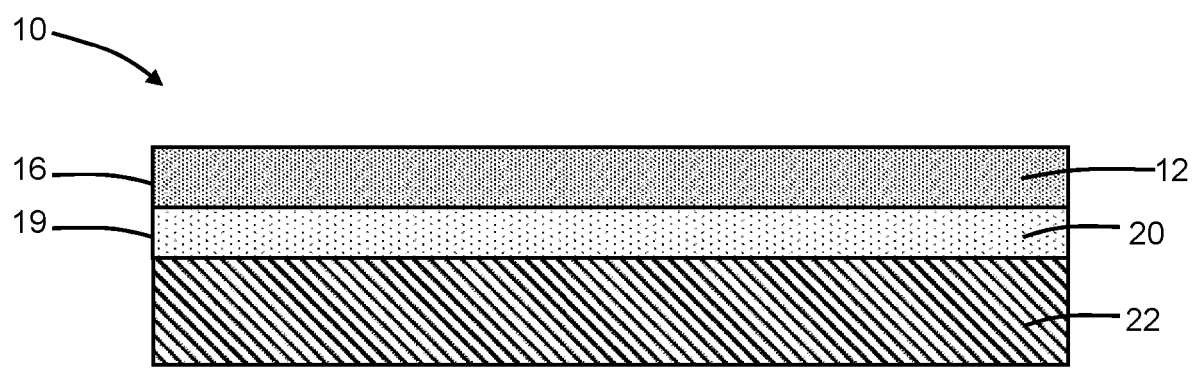
FIG. 2 is a cross-sectional view of the structure taken generally along line 2-2 in FIG. 1.

With reference to FIGS. 1, 2 and in accordance with embodiments of the invention, a structure 10 for a multilayer edge coupler includes a waveguide core 12 having a tapered section 14 of a given length and an end surface 16. The tapered section 14 of the waveguide core 12 may extend lengthwise along a longitudinal axis 18. The tapered section 14 of the waveguide core 12 may terminate at the end surface 16. The tapered section 14 of the waveguide core 12 may have a width dimension that varies with position along the longitudinal axis 18 and that has a minimum width occurring at the end surface 16 such that the tapered section 14 is tapered (i.e., narrows) in a direction toward the end surface 16. In an embodiment, the width dimension of the tapered section 14 increases with increasing distance from the end surface 16. In an embodiment, the width dimension of the tapered section 14 may vary over its length based on a linear function to provide a trapezoidal shape. In an alternative embodiment, the width dimension of the tapered section 14 may vary over its length based on a non-linear function, such as a quadratic, parabolic, or exponential function.

The waveguide core 12 may be comprised of a single-crystal semiconductor material, such as single-crystal silicon. In an embodiment, the single-crystal semiconductor material may originate from a device layer of a silicon-on-insulator (SOI) substrate that further includes a dielectric layer 20 provided by a buried oxide layer and a substrate 22 comprised of a single-crystal semiconductor material, such as single-crystal silicon. The waveguide core 12 may be patterned from the device layer by lithography and etching processes during front-end-of-line processing. The waveguide core 12 and its tapered section 14 are positioned in a given level over the dielectric layer 20 and the substrate 22, and may directly contact the dielectric layer 20.

The end surface 16 of the waveguide core 12 is positioned adjacent to a side edge 19 of the dielectric layer 20 and substrate 22. The end surface 16 is also positioned adjacent to a side edge 79 (FIG. 9) of a back-end-of-line stack 78 that is subsequently formed in the process flow. In an embodiment, the end surface 16 may be coplanar or substantially coplanar with the side edge 19 and the side edge 79. In an embodiment, the end surface 16 may be inwardly spaced from the side edges 19, 79.

In an alternative embodiment, the waveguide core 12 may be comprised of a different material than single-crystal silicon. In an alternative embodiment, the waveguide core 12 may be comprised of silicon nitride that is deposited and patterned by lithography and etching processes. In an alternative embodiment, the waveguide core 12 may include a thin connected slab layer that is produced by controlled partial etching during patterning.

Figure 3:
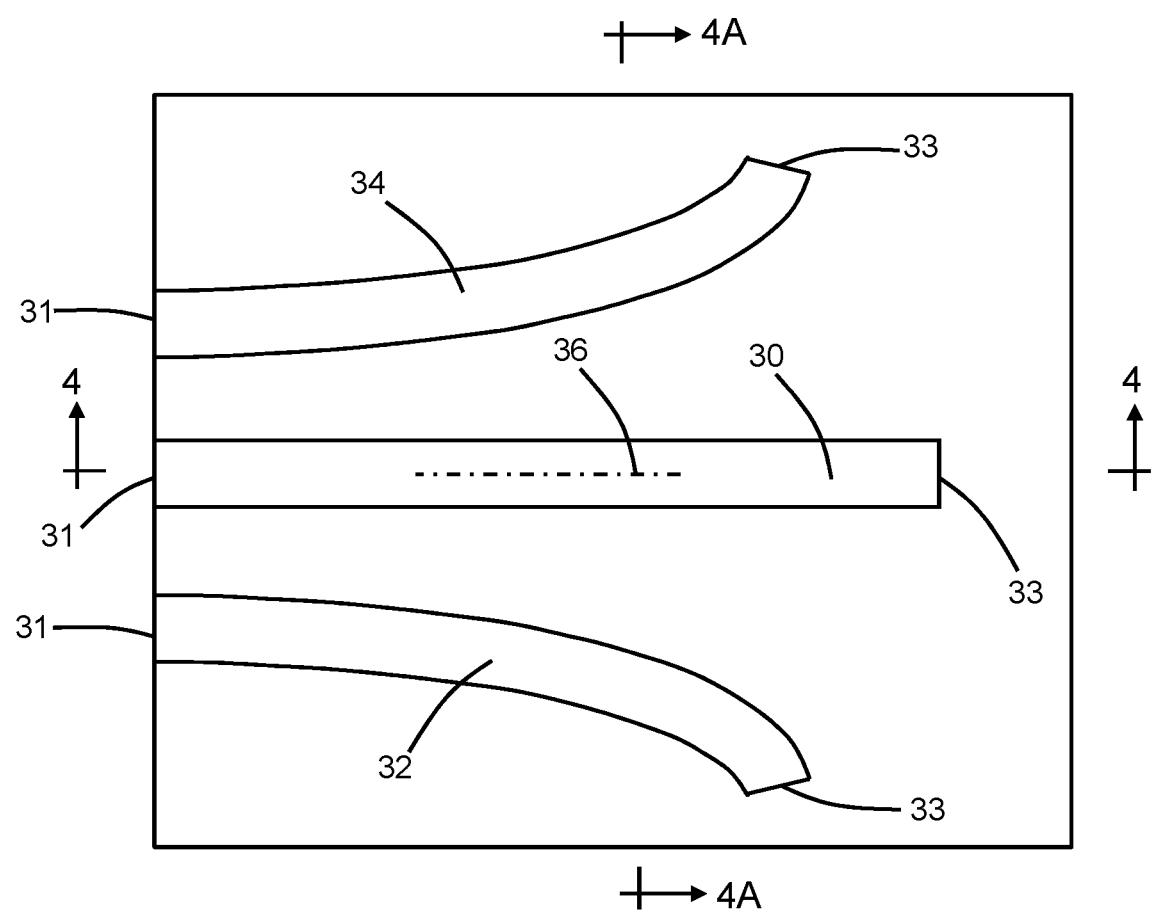
FIG. 3 is a top view of the structure at a fabrication stage subsequent to FIG. 1.
Figure 4:
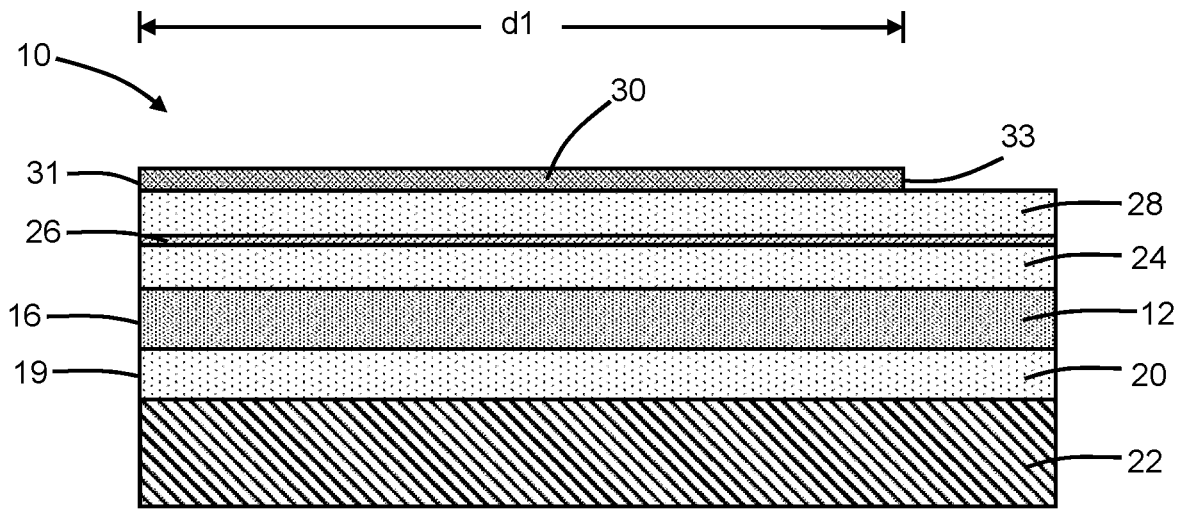
FIG. 4 is a cross-sectional view of the structure taken generally along line 4-4 in FIG. 3.
Figure 4A:
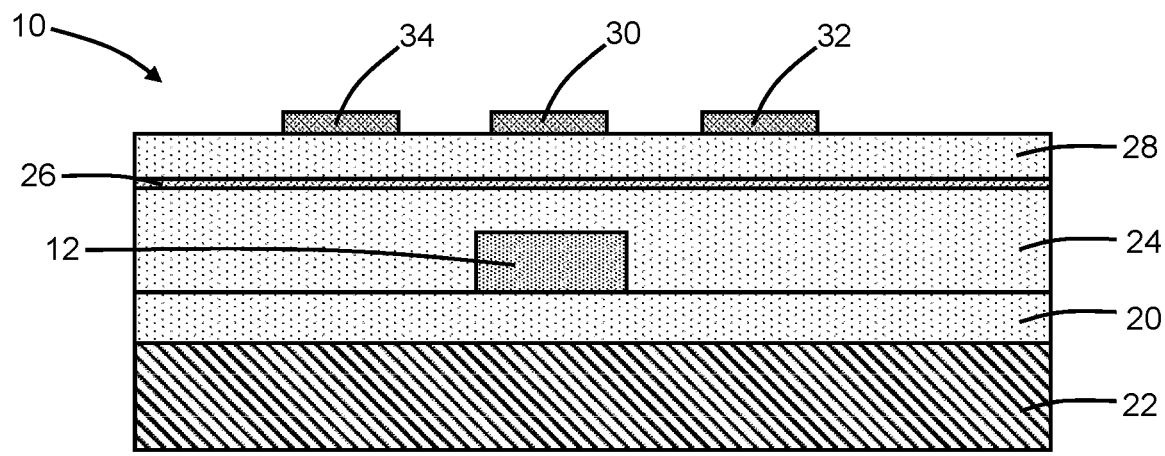
FIG. 4A is a cross-sectional view of the structure taken generally along line 4A-4A in FIG. 3.

With reference to FIGS. 3, 4, 4A in which like reference numerals refer to like features in FIGS. 1, 2 and at a subsequent fabrication stage, dielectric layers 24, 26, 28 are formed in a layer stack over the waveguide core 12 and dielectric layer 20. In an embodiment, the dielectric layers 24, 28 may be comprised of silicon dioxide, and the dielectric layer 26 may be comprised of silicon nitride. The silicon dioxide comprising the dielectric layers 24, 28 may be formed by plasma-enhanced chemical vapor deposition using ozone and tetraethylorthosilicate (TEOS) as reactants. Alternatively, the silicon dioxide comprising one or more of the dielectric layers 24, 28 may be fluorinated by adding fluorine as an additional reactant during plasma-enhanced chemical vapor deposition. Alternatively, the silicon dioxide comprising the dielectric layers 24, 28 may comprise stacked sublayers containing tetraethylorthosilicate silicon dioxide and fluorinated-tetraethylorthosilicate silicon dioxide. The dielectric layer 26 may have a refractive index that is greater than the respective refractive indices of the dielectric layers 24, 28, and the respective refractive indices of the dielectric layers 24, 26, 28 may be less than the refractive index of the waveguide core 12. In an embodiment, the dielectric layers 24, 28 may be comprised of a low-k dielectric material.

Figure 9:
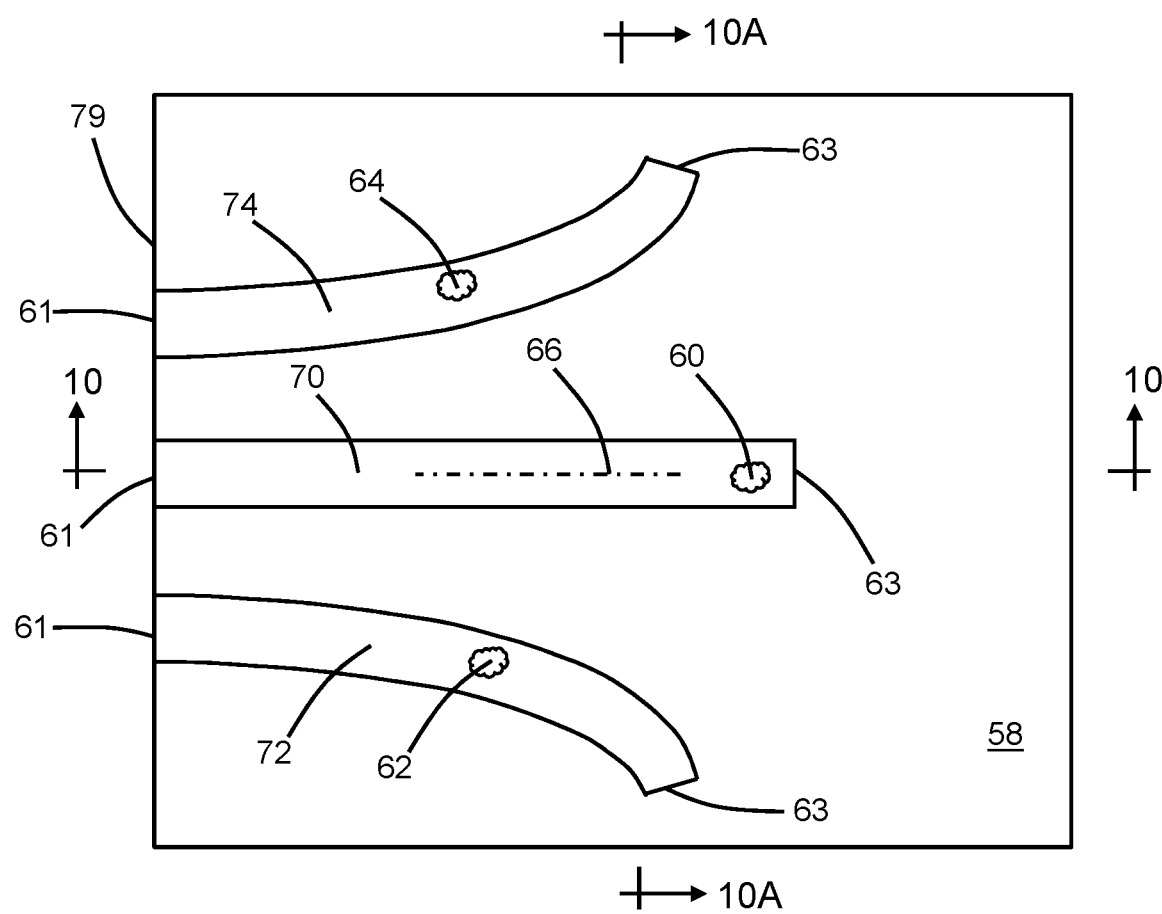
FIG. 9 is a top view of the structure at a fabrication stage subsequent to FIG. 7.

Features 30, 32, 34 are formed on the dielectric layer 28. Each of the features 30, 32, 34 is truncated to have a finite length and is terminated at its opposite ends by end surfaces 31, 33. In an embodiment, the end surfaces 31 of the features 30, 32, 34 may be coplanar or substantially coplanar with the side edge 19 and the side edge 79 (FIG. 9). In an embodiment, the end surfaces 33 of the features 30, 32, 34 may terminate before the end of the tapered section 14 of the waveguide core 12.

The feature 30 is laterally arranged between the feature 32 and the feature 34. The feature 30 extends along a longitudinal axis 36 from the end surface 31 to the end surface 33. The feature 30 is positioned to overlap with the tapered section 14 of the waveguide core 12. In an embodiment, the feature 30 may be centered over the tapered section 14 of the waveguide core 12. In an embodiment, the longitudinal axis 36 may be aligned parallel or substantially parallel to the longitudinal axis 18 of the tapered section 14 of the waveguide core 12.

The feature 32 is shaped as a bend that curves away from the longitudinal axis 36 of the feature 30 with a separation that increases with increasing distance from its end surface 31. The feature 34 is shaped as a bend that curves away from the longitudinal axis 36 of the feature 30 with a separation that increases with increasing distance from its end surface 31. The features 32, 34 curve away from the longitudinal axis 36 of the feature 30 in opposite directions within a horizontal plane. In an embodiment, the feature 32 and the feature 34 may be symmetrically arranged relative to the feature 30. In an embodiment, the feature 32 and the feature 34 may have equal or substantially equal lengths.

The feature 32 may extend between its end surfaces 31, 33 over a curved or curvilinear path in the layout of the structure 10 and may have a given curvature over its curved arc length. The feature 34 may extend between its end surfaces 31, 33 over a curved or curvilinear path in the layout of the structure 10 and may have a given curvature over its curved arc length. The curvature of the feature 32 is reversed or inverted relative to the curvature of the feature 34. In that regard, the features 32, 34 may trace smooth curves having a continuously-turning tangent at their inner and outer radii over their respective lengths.

The dielectric layers 24, 26, 28, which may be formed by middle-of-line processing, may include contacts that are coupled to electronic components, such as field-effect transistors, and active optical components, such as a Mach-Zehnder modulator. The features 30, 32, 34 may be patterned from a layer that is formed by back-end-of-line processing in the back-end-of-line stack 78.

The features 30, 32, 34 are comprised of a material that has a different composition than the materials of the dielectric layers 24, 26, 28 and that is available during back-end-of-line processing. In an embodiment, the features 30, 32, 34 may be comprised of silicon-carbon nitride (e.g., nitrogen-doped silicon carbide (SiCN)) deposited by chemical vapor deposition or plasma-enhanced chemical vapor deposition using reactants that supply silicon, carbon, and nitrogen. In an embodiment, the features 30, 32, 34 may be comprised of hydrogenated silicon-carbon nitride (e.g., hydrogenated nitrogen-doped silicon carbide (SiCNH)) deposited by chemical vapor deposition or plasma-enhanced chemical vapor deposition using reactants that supply silicon, carbon, nitrogen, and hydrogen. In an alternative embodiment, the features 30, 32, 34 may be comprised of a dielectric material having a refractive index that is greater than or equal to 1.65.

The features 30, 32, 34 are positioned in a given level in the back-end-of-line stack 78 over the dielectric layer 20 on the substrate 22. The level of the features 30, 32, 34 differs in elevation above the dielectric layer 20 from the level of the waveguide core 12 and its tapered section 14. The feature 30 overlaps with a portion of the tapered section 14 of the waveguide core 12 over a distance, d1. In an embodiment, end surface 33 of the feature 30 may be positioned over the tapered section 14 of the waveguide core 12.

Figure 5:
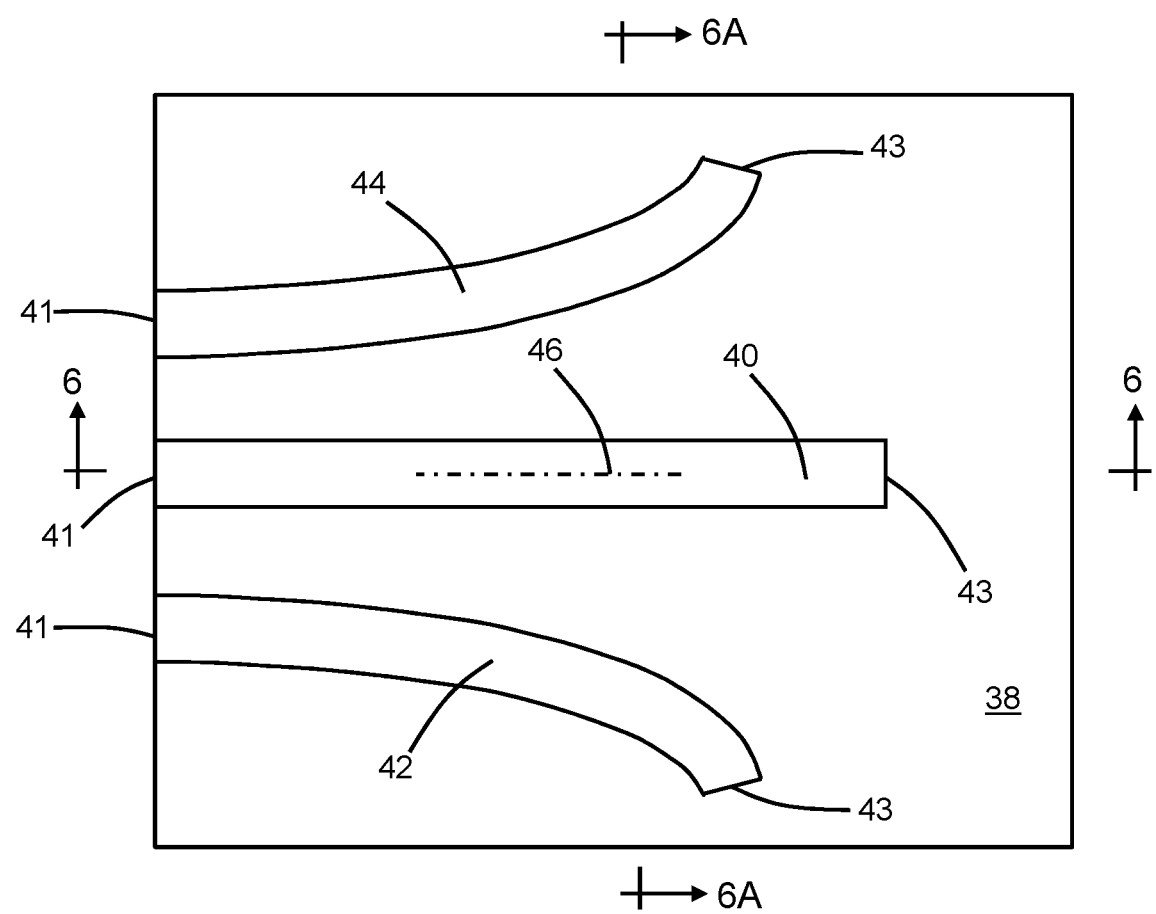
FIG. 5 is a top view of the structure at a fabrication stage subsequent to FIG. 3.
Figure 6:
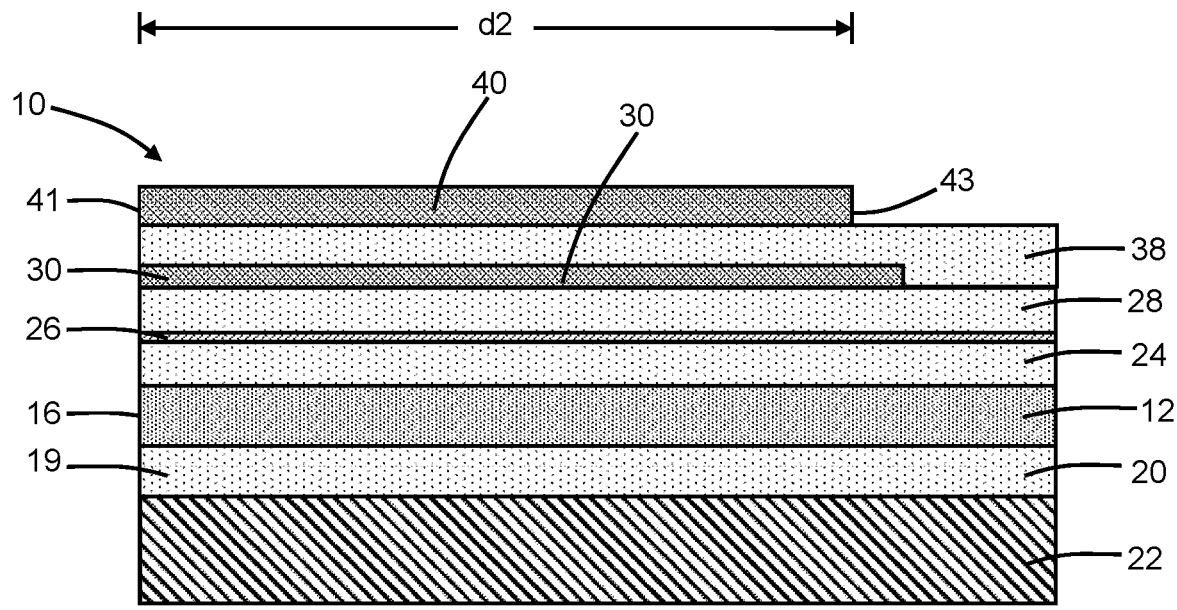
FIG. 6 is a cross-sectional view of the structure taken generally along line 6-6 in FIG. 5.
Figure 6A:
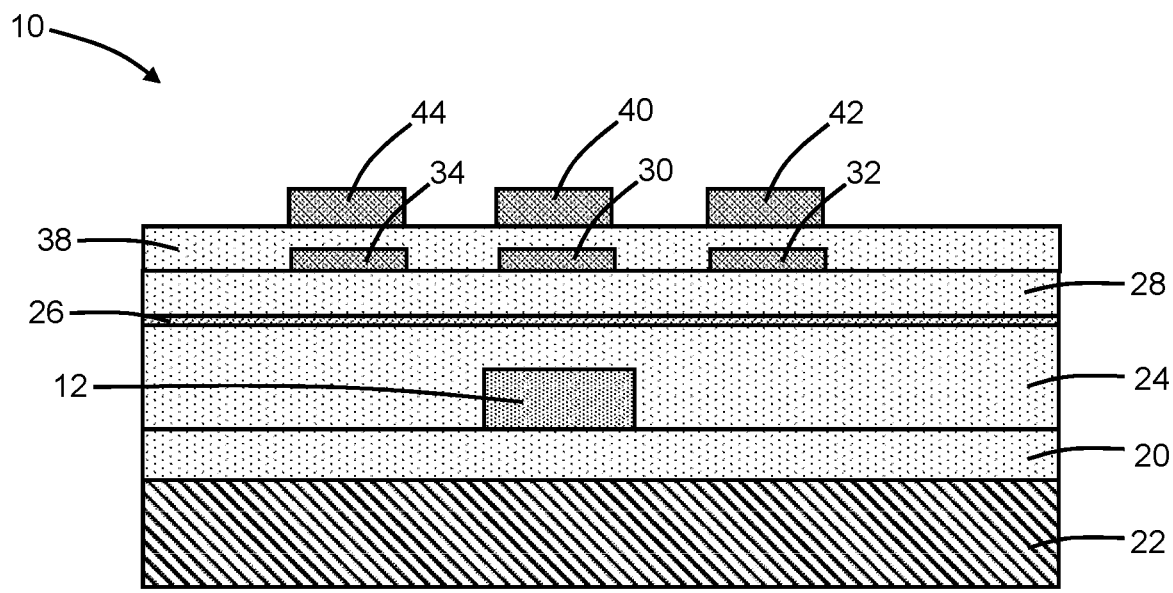
FIG. 6A is a cross-sectional view of the structure taken generally along line 6A-6A in FIG. 5.

With reference to FIGS. 5, 6, 6A in which like reference numerals refer to like features in FIGS. 3, 4, 4A and at a subsequent fabrication stage, a dielectric layer 38 is formed over the features 30, 32, 34 and dielectric layer 28. The dielectric layer 38 may be comprised of silicon dioxide (e.g., tetraethylorthosilicate silicon dioxide and/or fluorinated-tetraethylorthosilicate silicon dioxide) that is deposited and planarized by chemical-mechanical polishing. In an alternative embodiment, the dielectric layer 38 may be comprised of a low-k dielectric material.

Features 40, 42, 44 are formed on the dielectric layer 38. Each of the features 40, 42, 44 is truncated to have a finite length and is terminated at its opposite ends by end surfaces 41, 43. In an embodiment, the end surfaces 41 of the features 40, 42, 44 may be coplanar or substantially coplanar with the side edge 19 and the side edge 79 (FIG. 9). In an embodiment, the end surfaces 43 of the features 40, 42, 44 may terminate before the end of the tapered section 14 of the waveguide core 12. In an embodiment, the end surface 43 of the feature 40 may be positioned over the tapered section 14 of the waveguide core 12 and over the feature 30.

The feature 40 is laterally arranged between the feature 42 and the feature 44. The feature 40 extends along a longitudinal axis 46 from the end surface 41 to the end surface 43. The feature 40 is positioned to overlap with the tapered section 14 of the waveguide core 12 and to overlap with the feature 30. In an embodiment, the feature 40 may be centered over the feature 30. In an embodiment, the feature 40 may be centered over the tapered section 14 of the waveguide core 12. In an embodiment, the feature 40 may be centered over the feature 30 and centered over the tapered section 14 of the waveguide core 12. In an embodiment, the longitudinal axis 46 may be aligned parallel or substantially parallel to the longitudinal axis 36 of the feature 30. The feature 40 overlaps with a portion of the tapered section 14 of the waveguide core 12 over a distance, d2. In an embodiment, the distance, d2, may be less than the distance, d1, of overlap between the feature 30 and the tapered section 14.

The feature 42 is shaped as a bend that curves away from the longitudinal axis 46 of the feature 40 with a separation that increases with increasing distance from its end surface 41. The feature 44 is shaped as a bend that curves away from the longitudinal axis 46 of the feature 40 with a separation that increases with increasing distance from its end surface 41. The features 42, 44 curve away from the longitudinal axis 46 of the feature 40 in opposite directions within a horizontal plane. In an embodiment, the feature 42 and the feature 44 may be symmetrically arranged relative to the feature 40. In an embodiment, the feature 42 and the feature 44 may have equal or substantially equal lengths.

The feature 42 may extend between its end surfaces 41, 43 over a curved or curvilinear path in the layout of the structure 10 and may have a given curvature over its curved arc length. The feature 44 may extend between its end surfaces 41, 43 over a curved or curvilinear path in the layout of the structure 10 and may have a given curvature over its curved arc length. The curvature of the feature 42 is reversed or inverted relative to the curvature of the feature 44. In that regard, the features 42, 44 may trace smooth curves having a continuously-turning tangent at their inner and outer radii over their respective lengths. The feature 42 may overlap with the feature 32, and the feature 44 may overlap with the feature 34. In an embodiment, the curvature of the feature 42 may be equal or substantially equal to the curvature of the feature 32, and the curvature of the feature 44 may be equal or substantially equal to the curvature of the feature 34.

The features 40, 42, 44 may be comprised of a dielectric material having the same composition as the dielectric material constituting the features 30, 32, 34. In an embodiment, the features 40, 42, 44 may be comprised of nitrogen-doped silicon carbide. In an embodiment, the features 40, 42, 44 may be comprised of hydrogenated nitrogen-doped silicon carbide. In an embodiment, the features 40, 42, 44 may be comprised of a dielectric material having a refractive index that is greater than or equal to 1.65. The features 40, 42, 44 may be patterned from a layer that is formed by back-end-of-line processing in the back-end-of-line stack 78.

The features 40, 42, 44 are positioned in a given layer or level in the back-end-of-line stack 78 over the dielectric layer 20 on the substrate 22. The level of the features 40, 42, 44 differs in elevation above the dielectric layer 20 from the level of the waveguide core 12 and its tapered section 14 and also differs in elevation above the dielectric layer 20 from the level of the features 30, 32, 34.

Figure 7:
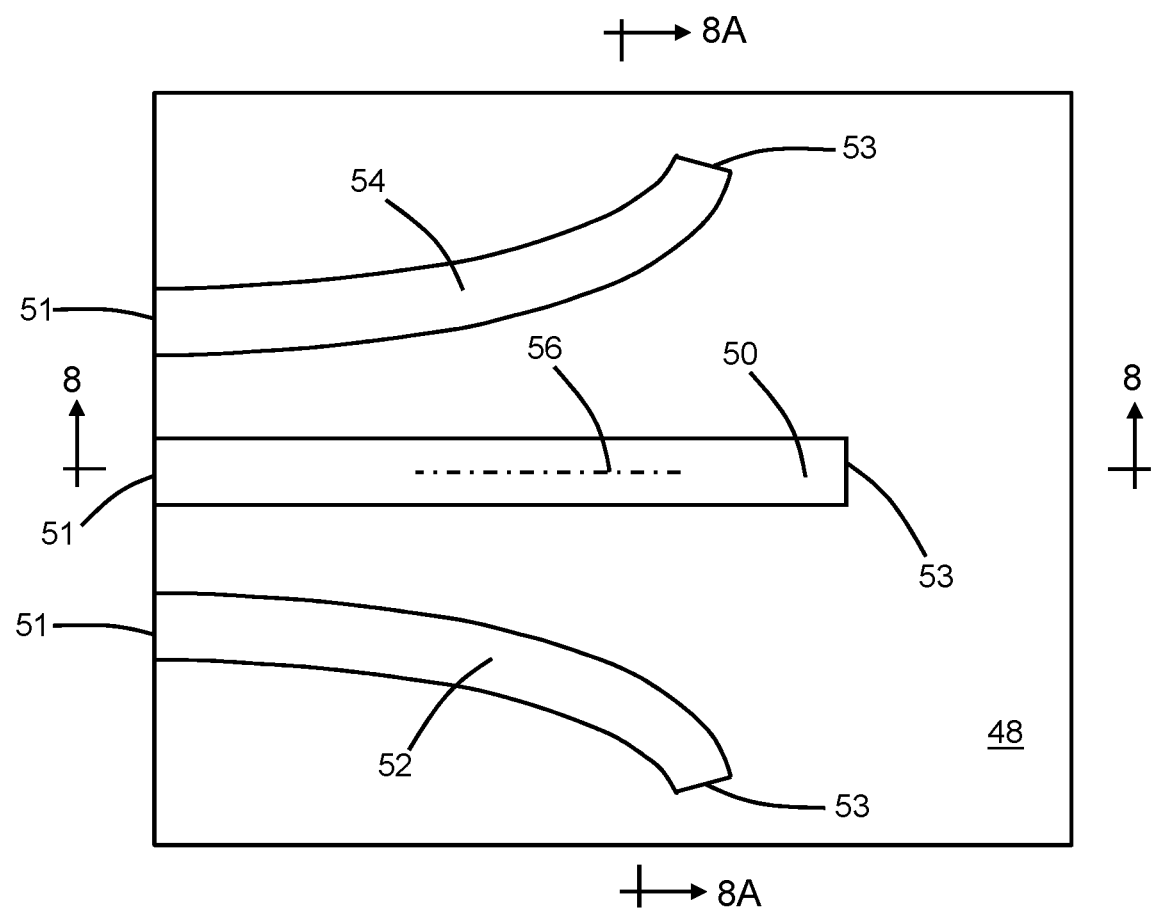
FIG. 7 is a top view of the structure at a fabrication stage subsequent to FIG. 5.
Figure 8:
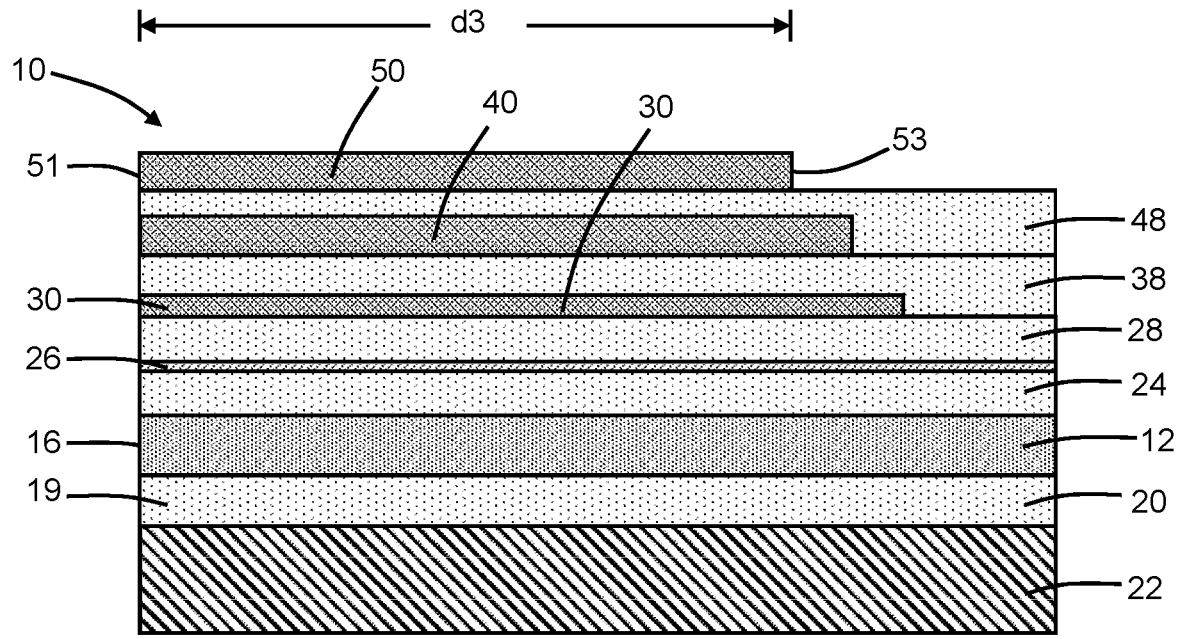
FIG. 8 is a cross-sectional view of the structure taken generally along line 8-8 in FIG. 7.
Figure 8A:
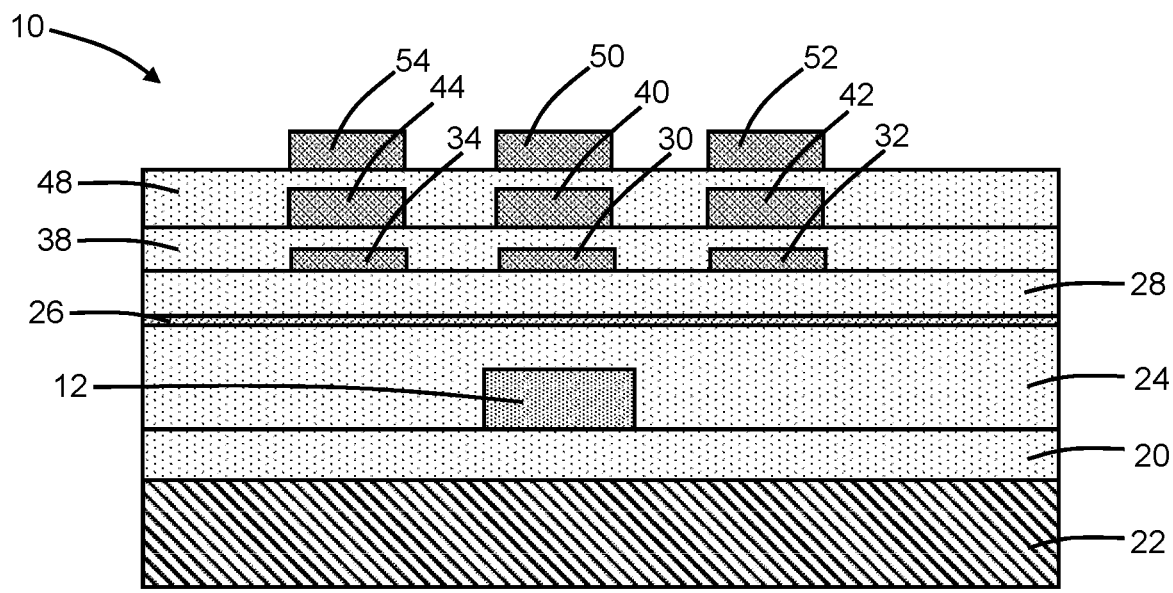
FIG. 8A is a cross-sectional view of the structure taken generally along line 8A-8A in FIG. 7.

With reference to FIGS. 7, 8, 8A in which like reference numerals refer to like features in FIGS. 5, 6, 6A and at a subsequent fabrication stage, a dielectric layer 48 is formed over the features 40, 42, 44 and dielectric layer 38. The dielectric layer 48 may be comprised of silicon dioxide (e.g., tetraethylorthosilicate silicon dioxide and/or fluorinated-tetraethylorthosilicate silicon dioxide) that is deposited and planarized by chemical-mechanical polishing. In an alternative embodiment, the dielectric layer 48 may be comprised of a low-k dielectric material.

Features 50, 52, 54 are formed on the dielectric layer 48. Each of the features 50, 52, 54 is truncated to have a finite length and is terminated at its opposite ends by end surfaces 51, 53. In an embodiment, the end surfaces 51 of the features 50, 52, 54 may be coplanar or substantially coplanar with the side edge 19 and the side edge 79 (FIG. 9). In an embodiment, the end surfaces 53 of the features 50, 52, 54 may terminate before the end of the tapered section 14 of the waveguide core 12. In an embodiment, the end surface 53 of the feature 50 may be positioned over the tapered section 14 of the waveguide core 12 and over the features 30, 40.

The feature 50 is laterally arranged between the feature 52 and the feature 54. The feature 50 extends along a longitudinal axis 56 from the end surface 51 to the end surface 53. The feature 50 is positioned to overlap with the tapered section 14 of the waveguide core 12 and to overlap with the features 30, 40. In an embodiment, the feature 50 may be centered over the features 30, 40. In an embodiment, the feature 50 may be centered over the tapered section 14 of the waveguide core 12. In an embodiment, the feature 50 may be centered over the features 30, 40 and centered over the tapered section 14 of the waveguide core 12. In an embodiment, the longitudinal axis 56 may be aligned parallel or substantially parallel to the longitudinal axis 46 of the feature 40. The feature 50 overlaps with a portion of the tapered section 14 of the waveguide core 12 over a distance, d3. In an embodiment, the distance, d3, may be less than the distance, d1, of overlap between the feature 30 and the tapered section 14 and less than the distance, d2, of overlap between the feature 40 and the tapered section 14.

The feature 52 is shaped as a bend that curves away from the longitudinal axis 56 of the feature 50 with a separation that increases with increasing distance from its end surface 51. The feature 54 is shaped as a bend that curves away from the longitudinal axis 56 of the feature 50 with a separation that increases with increasing distance from its end surface 51. The features 52, 54 curve away from the longitudinal axis 56 of the feature 50 in opposite directions within a horizontal plane. In an embodiment, the feature 52 and the feature 54 may be symmetrically arranged relative to the feature 50. In an embodiment, the feature 52 and the feature 54 may have equal or substantially equal lengths.

The feature 52 may extend between its end surfaces 51, 53 over a curved or curvilinear path in the layout of the structure 10 and may have a given curvature over its curved arc length. The feature 54 may extend between its end surfaces 51, 53 over a curved or curvilinear path in the layout of the structure 10 and may have a given curvature over its curved arc length. The curvature of the feature 52 is reversed or inverted relative to the curvature of the feature 54. In that regard, the features 52, 54 may trace smooth curves having a continuously-turning tangent at their inner and outer radii over their respective lengths. The feature 52 may overlap with the feature 42, and the feature 54 may overlap with the feature 44. In an embodiment, the curvature of the feature 52 may be equal or substantially equal to the curvature of the feature 42, and the curvature of the feature 54 may be equal or substantially equal to the curvature of the feature 44.

The features 50, 52, 54 may be comprised of a dielectric material having the same composition as the dielectric material constituting the features 30, 32, 34. In an embodiment, the features 50, 52, 54 may be comprised of nitrogen-doped silicon carbide. In an embodiment, the features 50, 52, 54 may be comprised of hydrogenated nitrogen-doped silicon carbide. In an embodiment, the features 50, 52, 54 may be comprised of a dielectric material having a refractive index that is greater than or equal to 1.65. The features 50, 52, 54 may be patterned from a layer that is formed by back-end-of-line processing in the back-end-of-line stack 78.

The features 50, 52, 54 are positioned in a given level in the back-end-of-line stack 78 over the dielectric layer 20 on the substrate 22. The level of the features 50, 52, 54 differs in elevation above the dielectric layer 20 from the level of the waveguide core 12 and its tapered section 14 and also differs in elevation above the dielectric layer 20 from the level of the features 30, 32, 34 and the level of features 40, 42, 44.

Figure 10:
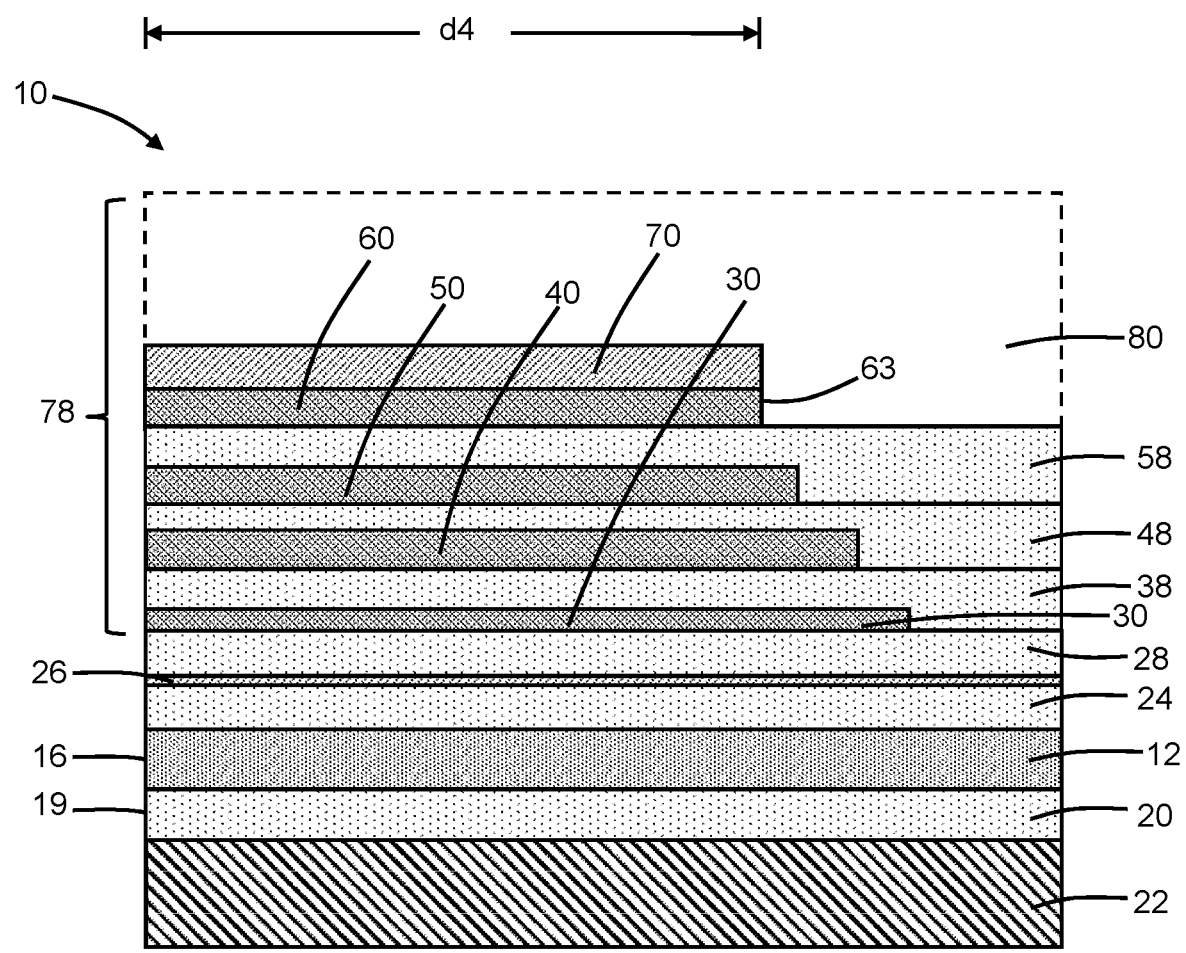
FIG. 10 is a cross-sectional view of the structure taken generally along line 10-10 in FIG. 9.
Figure 10A:
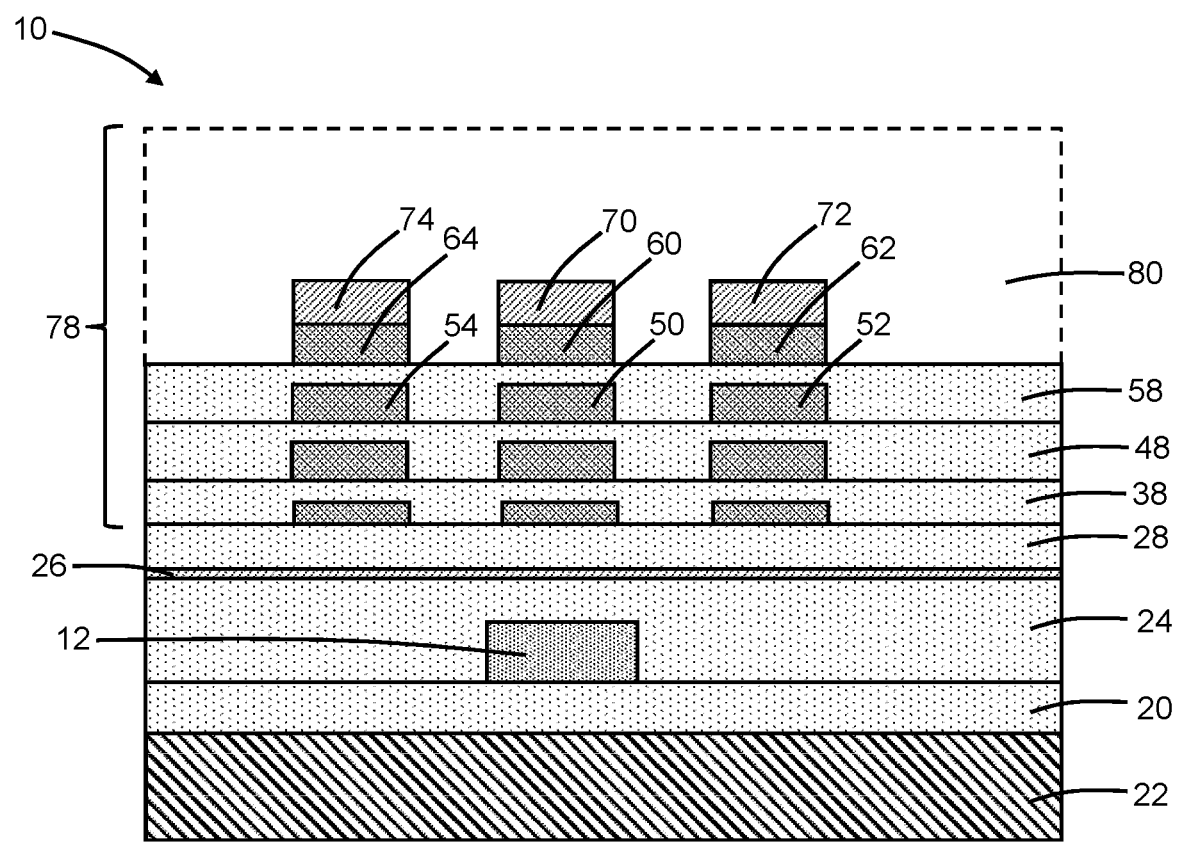
FIG. 10A is a cross-sectional view of the structure taken generally along line 10A-10A in FIG. 9.

With reference to FIGS. 9, 10, 10A in which like reference numerals refer to like features in FIGS. 7, 8, 8A and at a subsequent fabrication stage, a dielectric layer 58 is formed over the features 50, 52, 54 and dielectric layer 48. The dielectric layer 58 may be comprised of silicon dioxide (e.g., tetraethylorthosilicate silicon dioxide and/or fluorinated-tetraethylorthosilicate silicon dioxide) that is deposited and planarized by chemical-mechanical polishing. In an alternative embodiment, the dielectric layer 58 may be comprised of a low-k dielectric material.

Features 60, 62, 64 are formed on the dielectric layer 58. Each of the features 60, 62, 64 is truncated to have a finite length and is terminated at its opposite ends by end surfaces 61, 63. In an embodiment, the end surfaces 61 of the features 60, 62, 64 may be coplanar or substantially coplanar with the side edge 19 and the side edge 79. In an embodiment, the end surfaces 63 of the features 60, 62, 64 may terminate before the end of the tapered section 14 of the waveguide core 12. In an embodiment, the end surface 63 of the feature 60 may be positioned over the tapered section 14 of the waveguide core 12 and over the features 30, 40, 50.

The feature 60 is laterally positioned between the feature 62 and the feature 64. The feature 60 extends along a longitudinal axis 66 from the end surface 61 to the end surface 63. The feature 60 is positioned to overlap with the tapered section 14 of the waveguide core 12 and to overlap with the features 30, 40, 50. In an embodiment, the feature 60 may be centered over the features 30, 40, 50. In an embodiment, the feature 60 may be centered over the tapered section 14 of the waveguide core 12. In an embodiment, the feature 60 may be centered over the features 30, 40, 50 and centered over the tapered section 14 of the waveguide core 12. In an embodiment, the longitudinal axis 66 may be aligned parallel or substantially parallel to the longitudinal axis 56 of the feature 50. The feature 60 overlaps with a portion of the tapered section 14 of the waveguide core 12 over a distance, d4. In an embodiment, the distance, d4, may be less than the distance, d1, of overlap between the feature 30 and the tapered section 14, less than the distance, d2, of overlap between the feature 40 and the tapered section 14, and less than the distance, d3, of overlap between the feature 50 and the tapered section 14.

The feature 62 is shaped as a bend that curves away from the longitudinal axis 66 of the feature 60 with a separation that increases with increasing distance from its end surface 61. The feature 64 is shaped as a bend that curves away from the longitudinal axis 66 of the feature 60 with a separation that increases with increasing distance from its end surface 61. The features 62, 64 curve away from the longitudinal axis 66 of the feature 60 in opposite directions within a horizontal plane. In an embodiment, the feature 62 and the feature 64 may be symmetrically arranged relative to the feature 60. In an embodiment, the feature 62 and the feature 64 may have equal or substantially equal lengths.

The feature 62 may extend between its end surfaces 61, 63 over a curved or curvilinear path in the layout of the structure 10 and may have a given curvature over its curved arc length. The feature 64 may extend between its end surfaces 61, 63 over a curved or curvilinear path in the layout of the structure 10 and may have a given curvature over its curved arc length. The curvature of the feature 62 is reversed or inverted relative to the curvature of the feature 64. In that regard, the features 62, 64 may trace smooth curves having a continuously-turning tangent at their inner and outer radii over their respective lengths. The feature 62 may overlap with the feature 52, and the feature 64 may overlap with the feature 54. In an embodiment, the curvature of the feature 62 may be equal or substantially equal to the curvature of the feature 52, and the curvature of the feature 64 may be equal or substantially equal to the curvature of the feature 54.

The features 60, 62, 64 may be comprised of a dielectric material having the same composition as the dielectric material constituting the features 30, 32, 34. In an embodiment, the features 60, 62, 64 may be comprised of nitrogen-doped silicon carbide. In an embodiment, the features 60, 62, 64 may be comprised of hydrogenated nitrogen-doped silicon carbide. In an embodiment, the features 60, 62, 64 may be comprised of a dielectric material having a refractive index that is greater than or equal to 1.66. The features 60, 62, 64 may be patterned from a layer that is formed by back-end-of-line processing in the back-end-of-line stack 78.

The features 60, 62, 64 are positioned in a given level in the back-end-of-line stack 78 over the dielectric layer 20 on the substrate 22. The level of the features 60, 62, 64 differs in elevation above the dielectric layer 20 from the level of the waveguide core 12 and its tapered section 14 and also differs in elevation above the dielectric layer 20 from the level of the features 30, 32, 34 and the level of features 40, 42, 44.

In the representative embodiment, the features 60, 62, 64 are capped by features 70, 72, 74 that are comprised of a dielectric material having a different composition than the dielectric material comprising the features 60, 62, 64 in order to provide respective heterogenous stacks. In an embodiment, the features 70, 72, 74 may be comprised of silicon nitride. In an embodiment, the features 70, 72, 74 and the features 60, 62, 64 may have equal dimensions and shapes to provide a complete overlap. In an embodiment, the features 70, 72, 74 may be positioned in direct physical contact with the features 60, 62, 64.

Processing continues with the formation of additional dielectric layers 80 of the back-end-of-line stack 78 over the features 60, 62, 64 and dielectric layer 58. During an assembly phase, an optical fiber (e.g., a single-mode optical fiber) may be positioned adjacent to the back-end-of-line stack 78 and aligned with the structure 10.

In use, an optical fiber is positioned adjacent to the back-end-of-line stack 78 and affixed in alignment with the structure 10. Because of the location of the features of the structure 10 in the back-end-of-line stack 78, the optical fiber does not have to be placed into a groove formed in the back-end-of-line stack 78 and substrate 22. Instead, the optical fiber may be positioned in a butted relationship with the side edge 79 of the back-end-of-line stack 78 adjacent to the structure 10 without forming a groove for its placement. The arrangement of the features in the different levels of the back-end-of-line stack 78 may promote efficient coupling of optical signals from the optical fiber to the tapered section 14 of the waveguide core 12. The features are dimensioned and positioned at the side edge 19 so as not to diffract or reflect light at the wavelength of operation and act as an effective optical material, and therefore define a metamaterial.

Figure 11:
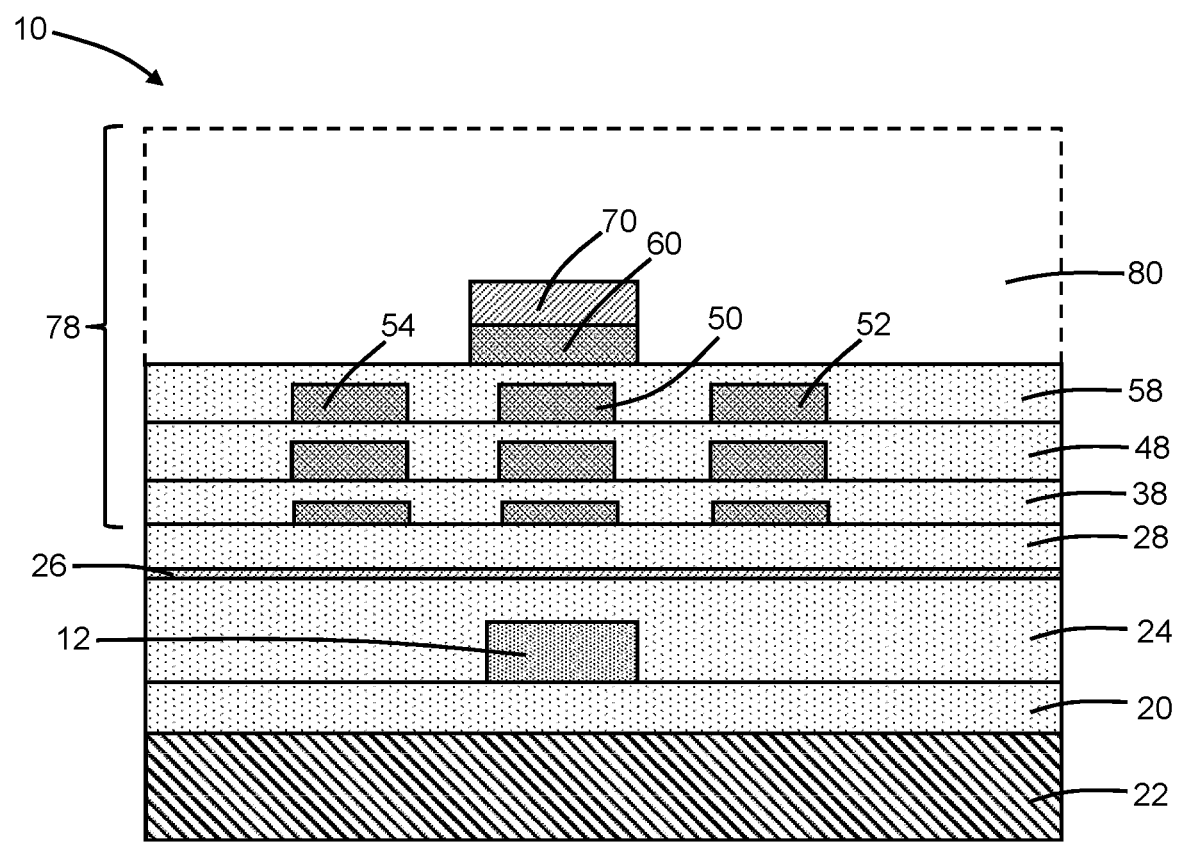
FIGS. 11 and 12 are cross-sectional views of structures in accordance with alternative embodiments of the invention.

With reference to FIG. 11 and in accordance with alternative embodiments, the structure 10 may be modified to omit the features 62, 64 and the features 72, 74 from the topmost level of the back-end-of-line stack 78. The central stacked features 60, 70 are retained and may be widened relative to the width of the underlying features 30, 40, 50.

Figure 12:
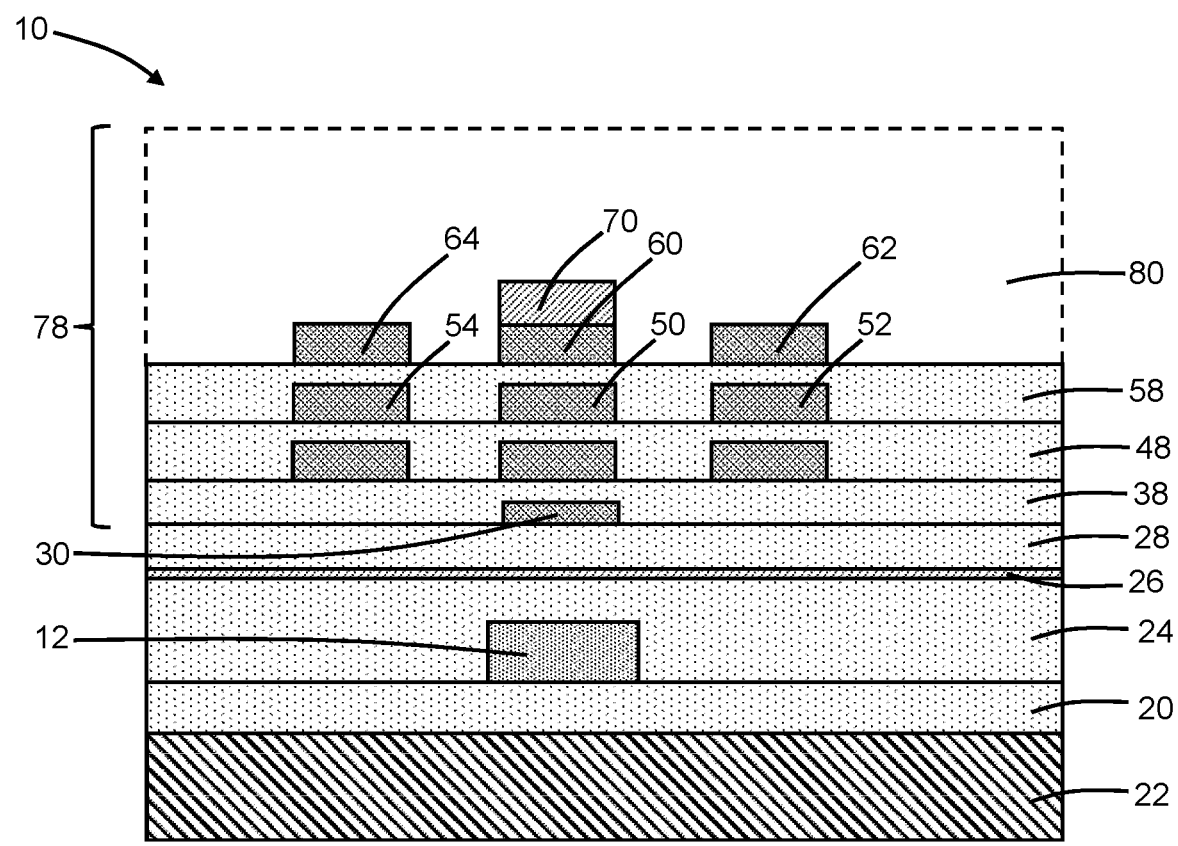

With reference to FIG. 12 and in accordance with alternative embodiments, the structure 10 may be modified to omit the features 32, 34 from the lowermost level of the back-end-of-line stack 78. The central feature 30 is retained beneath the features 30, 40, 50. In an embodiment, the features 72, 74 may be omitted from the topmost level of the back-end-of-line stack 78 such that the features 62, 64 are uncapped. The central feature 60 may remain capped by the feature 70 to provide a heterogenous stack of dielectric materials.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may overlap if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for an edge coupler, the structure comprising:
    a dielectric layer;
    a waveguide core over the dielectric layer, the waveguide core including a tapered section; and
    a back-end-of-line stack over the waveguide core and the dielectric layer, the back-end-of-line stack including a first interlayer dielectric layer, a second interlayer dielectric layer on the first interlayer dielectric layer, a side edge, a first feature, a second feature, a third feature laterally arranged between the first feature and the second feature, and a fourth feature, the first feature, the second feature, and the third feature positioned on the first interlayer dielectric layer adjacent to the side edge, the fourth feature positioned on the second interlayer dielectric layer over the third feature, the third feature terminating at a first end surface adjacent to the side edge and a second end surface opposite to the first end surface, the fourth feature terminating at a third end surface adjacent to the side edge and a fourth end surface opposite to the third end surface, the third feature overlapping with the tapered section of the waveguide core over a first distance between the first end surface and the second end surface, the fourth feature overlapping with the tapered section of the waveguide core over a second distance between the third end surface and the fourth end surface, and the second distance less than the first distance.

2. The structure of claim 1 wherein the first feature, the second feature, and the third feature comprise nitrogen-doped silicon carbide or hydrogenated nitrogen-doped silicon carbide.

3. The structure of claim 1 wherein the first feature, the second feature, and the third feature comprise a dielectric material having a refractive index that is greater than or equal to 1.65.

4. The structure of claim 1 wherein the third feature is centered over the tapered section of the waveguide core.

5. The structure of claim 1 wherein the third feature has a longitudinal axis, the first feature curves away from the longitudinal axis of the third feature in a first direction, and the second feature curves away from the longitudinal axis of the third feature in a second direction opposite from the first direction.

6. The structure of claim 1 wherein the first feature is laterally spaced from the third feature by a first spacing that increases with increasing distance from the side edge of the back-end-of-line stack, and the second feature is laterally spaced from the third feature by a second spacing that increases with increasing distance from the side edge of the back-end-of-line stack.

7. The structure of claim 6 wherein the third feature has a longitudinal axis, the first feature curves away from the longitudinal axis of the third feature to provide the first spacing that increases with increasing distance from the side edge of the back-end-of-line stack, and the second feature curves away from the longitudinal axis of the third feature to provide the second spacing that increases with increasing distance from the side edge of the back-end-of-line stack.

8. The structure of claim 1 wherein the second end surface of the third feature is disposed over the tapered section of the waveguide core, and the fourth end surface of the fourth feature is disposed over the tapered section of the waveguide core.

9. The structure of claim 8 wherein the first end surface of the third feature and the third end surface of the fourth feature are coextensive with the side edge of the back-end-of-line stack.

10. The structure of claim 1 further comprising:
a substrate,
wherein the tapered section of the waveguide core is positioned in a vertical direction between the third feature and the substrate.

11. The structure of claim 10 wherein the dielectric layer is positioned in the vertical direction between the waveguide core and the substrate.

12. The structure of claim 1 wherein the back-end-of-line stack includes a fifth feature and a sixth feature positioned on the second interlayer dielectric layer adjacent to the side edge of the back-end-of-line stack, and the fourth feature is laterally arranged between the fifth feature and the sixth feature.

13. The structure of claim 12 wherein the first feature, the second feature, and the third feature comprise nitrogen-doped silicon carbide or hydrogenated nitrogen-doped silicon carbide, and the fourth feature, the fifth feature, and the sixth feature comprise nitrogen-doped silicon carbide or hydrogenated nitrogen-doped silicon carbide.

14. The structure of claim 1 wherein the third feature is longer than the fourth feature.

15. The structure of claim 1 wherein the first feature, the second feature, and the third feature are dimensioned and positioned at the side edge to define a metamaterial.

16. A method of forming a structure for an edge coupler, the method comprising:
forming a waveguide core over a dielectric layer, wherein the waveguide core includes a tapered section; and
forming a back-end-of-line stack over the waveguide core and the dielectric layer wherein the back-end-of-line stack includes a first interlayer dielectric layer, a second interlayer dielectric layer on the first interlayer dielectric layer, a side edge, a first feature, a second feature, a third feature laterally arranged between the first feature and the second feature, and a fourth feature, the first feature, the second feature, and the third feature are positioned on the first interlayer dielectric layer adjacent to the side edge, the fourth feature is positioned on the second interlayer dielectric layer over the third feature, the third feature terminates at a first end surface adjacent to the side edge and a second end surface opposite to the first end surface, the fourth feature terminates at a third end surface adjacent to the side edge and a fourth end surface opposite to the third end surface, the third feature overlaps with the tapered section of the waveguide core by a first distance between the first end surface and the second end surface, the fourth feature overlaps with the tapered section of the waveguide core over a second distance between the third end surface and the fourth end surface, and the second distance is less than the first distance.

17. The method of claim 16 wherein the first feature, the second feature, and the third feature comprise nitrogen-doped silicon carbide or hydrogenated nitrogen-doped silicon carbide.

18. The method of claim 16 wherein the third feature has a longitudinal axis, the first feature curves away from the longitudinal axis of the third feature in a first direction, and the second feature curves away from the longitudinal axis of the third feature in a second direction opposite from the first direction.

19. The method of claim 16 further comprising:
forming a fifth feature and a sixth feature positioned on the second interlayer dielectric layer of the back-end-of-line stack adjacent to the side edge,
wherein the fourth feature is laterally between the fifth feature and the sixth feature, and the fourth feature has an overlapping relationship with the third feature.

20. The structure of claim 14 wherein the first end surface of the third feature and the third end surface of the fourth feature are coextensive with the side edge of the back-end-of-line stack, and the third feature and the fourth feature are centered over the tapered section of the waveguide core.

* * * * *